(12) United States Patent  (10) Patent No.: US 7,195,356 B1
Sharp  (45) Date of Patent: Mar. 27, 2007

(54) SPLIT-PATH COLOR SWITCHING SYSTEM AND METHOD

(75) Inventor: Gary D. Sharp, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 312 days.

(21) Appl. No.: 10/946,491

(22) Filed: Sep. 21, 2004

Related U.S. Application Data

(60) Provisional application No. 60/504,824, filed on Sep. 22, 2003.

(51) Int. Cl.
G03B 21/14 (2006.01)

(52) U.S. Cl. .............. 353/20; 353/31; 349/18; 349/119; 359/501

(58) Field of Classification Search ........... 353/20, 353/31, 34, 37, 84; 349/5, 7, 8, 9, 18, 117, 349/121, 97, 119; 359/501, 502
See application file for complete search history.

(56) References Cited

U.S. PATENT DOCUMENTS

| | | | |
|---|---|---|---|
| 5,111,315 A * | 5/1992 | Ledebuhr | ............ 349/5 |
| 5,319,478 A * | 6/1994 | Funfschilling et al. | ...... 349/181 |
| 5,565,933 A | 10/1996 | Reinsch | |
| 5,929,946 A | 7/1999 | Sharp et al. | |
| 5,953,083 A | 9/1999 | Sharp | |
| 5,990,996 A | 11/1999 | Sharp | |
| 5,999,240 A | 12/1999 | Sharp et al. | |
| 6,049,367 A | 4/2000 | Sharp et al. | |
| 6,243,065 B1 * | 6/2001 | Robrish et al. | ............ 345/97 |
| 6,417,892 B1 * | 7/2002 | Sharp et al. | ............ 348/742 |
| 6,452,646 B1 | 9/2002 | Sharp et al. | |
| 6,650,377 B2 * | 11/2003 | Robinson et al. | ............ 349/9 |
| 6,686,975 B2 * | 2/2004 | Anderson et al. | ............ 349/5 |
| 7,002,752 B2 * | 2/2006 | Chen et al. | ............ 359/634 |
| 7,083,282 B1 * | 8/2006 | Sharp et al. | ............ 353/20 |

* cited by examiner

*Primary Examiner*—William C. Dowling
(74) *Attorney, Agent, or Firm*—Baker & McKenzie LLP (57) ABSTRACT

The present application describes a retarder stack color switch using a single polarization analyzer for reflective-mode projection displays. The single polarization analyzer permits additive mode switching, which optimizes the chrominance of the additive primary outputs and the black state. Moreover, the single analyzer color switch provides a white state, which is frequently used in sequential systems. The single analyzer color switch overcomes some of the cost and manufacturing challenges associated with conventional transmissive full color switches based on retarder-stack-filters. The single analyzer color switch according to an embodiment uses a split-path so that relatively weak colors can follow a "high-efficiency" path.

35 Claims, 9 Drawing Sheets

SPLIT-PATH COLOR SWITCHING SYSTEM AND METHOD

CROSS-REFERENCE TO PRIOR APPLICATIONS

This application claims priority to U.S. provisional patent application No. 60/504,824, filed Sep. 22, 2003 entitled "Split-Path Color Switching System and Method."

FIELD OF THE INVENTION

The present invention relates generally to color switching systems for sequential projection devices, and more particularly, to a color switching system for reflection-mode liquid crystal devices.

BACKGROUND

Generally, electromechanical components are used in single-modulator sequential-color display systems to produce full-color projected images. In such systems, a color wheel is typically spun at high rotations per minute to minimize color break-up artifacts and support a 480 Hz field rate. The duty cycle for such devices is determined by the "spoke-time." The "spoke-time" is the time required for a spot to transition from one color segment to the next color segment. Typically, color wheels include two color segments for each primary color (red, blue and green). The relative field duration of color wheels is determined by the angular extent of each color segment. Color wheels provide high throughput and are polarization independent. Thus, color wheels are suitable for polarization independent applications such as digital micromirror devices.

Typically, black wedges are introduced between color segments on a color wheel to provide blanking for a display during loading/settling of an image. The blanking reduces projector efficiency for meeting color gamut requirements. Further, the mechanical rotation of color wheels poses difficulties in high-vibration environments such as, applications developed for commercial or military aircraft, automobiles, or other mobile applications or applications otherwise subject to vibration or acceleration. More recently, color switches are being used as an alternative for color wheels in projection displays. Typically, liquid-crystal-based color switches are used with various color-selective components such as, dichroic mirrors, pleochroic dye color polarizers, cholesteric liquid crystals, and retarder stacks. Some color modulators include liquid-crystal polarization switches. Typically, these color modulators are used in CRT-based displays to obtain shadow-mask-free, high-resolution color displays.

Some reflection-mode projection display systems include retarder-stack-based color switches. The retarder-stack-based color switches are used to modulate the polarization of colored light onto a display panel by placing a retarder stack between a Polarizing Beam Splitter ("PBS") and a Liquid Crystal on Silicon ("LCoS") display panel. Retarder-stack-based color switches with a single stack and a single reflective modulator are also used for white/primary switching similar to transmissive mode projection display systems.

Retarder-stack-based color switches provide full-color in transmission mode. These color switches include separate red, green, and blue analyzer stages, each independently operating on the polarization of one primary color. The separate analyzer stages permit additive mode switching, which optimizes the chrominance of the additive primary outputs and the black state. However, the manufacturability of a full-color retarder-stack-based color switch is substantially difficult because the complexity of a filter stage for the retarder-stack-based color switch increases with wavelength due to inverse wavelength dependence of retardation and birefringence dispersion. This is exacerbated by the characteristic power spectra of ultra-high-pressure mercury (UHP) lamps, which are yellow rich and red deficient. For example, a red filter with a steep transition slope and low cyan (blue+green+yellow) leakage requires a pair of stacks with many layers. Similarly, a blue stage of the retarder-stack-based color switch may contain a total of 8–10 retarder layers, while a red stage may contain 30–36 layers to achieve an acceptable color transition slope.

Other problems with retarder-stack-based color switches include restricted field-of-view, high switching time, and poor throughput. The field-of-view of these color switches is often restricted by the stability of the red color coordinate with incidence angle and azimuth often due to blue/green leakage. This leakage occurs in part because of the large positive z-retardation of the energized pi-cells in the blue/green stage. To overcome incidence angle effects, additional layers are frequently required for compensation. These layers are in addition to compensation required to nullify the residual in-plane retardation of a fully energized pi-cell.

The switching time issues of retarder-stack-based color switches relate to the retardation swing necessary to fully modulate the red field. For example, the modulation limit can be reached in most commercially available liquid crystal fluids in an in-plane compensated pi-cell for 310 nm of on-state retardation. In elevated temperature conditions, the 0–100% time constant of these color switches can exceed 1 ms, and in some instances, 100% transmission is never reached.

Because these color switches use a common-path, each color must pass through all three stages. Thus, it is difficult for a color switch to match the insertion loss of a color wheel. The manufacturing tolerance of these color switches can influence red saturation, and a delicate balance exists between stacks on either side of a pi-cell. Any error in this balance can cause leakages when the pi-cell is driven high. Such leakages are often cumulative due to the interaction between various stages on a field basis. Thus, manufacturing issues pertain largely to the lack of independence in manufacturing retarder stacks. In practice, it is challenging to assess the spectral leakage characteristics of a particular stack until it is paired with its counterpart. Conversely, forcing a stack to perform well relative to an arbitrary standard is overly restrictive, which unnecessarily reduces yields. Conventional transmissive color-switches also have parallax issues due to the longitudinal path-length between patterned devices. There are currently no practical methods for implementing this without bulkiness or high cost.

SUMMARY OF THE INVENTION

Disclosed embodiments provide a color switch that overcomes the limitations of color wheels. The color switch can be used for display systems such as, LCoS displays that use polarized light to create imagery. The color switch provides rapid switching, for example, in approximately 50 microseconds or less. The color switch produces a higher field rate, which enables better color breakup suppression without efficiency losses. Certain liquid crystal devices and modes can be used for high-speed operation without noise and reliability concerns. These liquid crystal devices are robust under all or most practical operating conditions and field rates. The environmental insensitivity of the temporal response of a liquid crystal device allows meticulous timing optimization with respect to a display panel. The lack of moving parts permits the color switch to operate in high-vibration environments such as in commercial or military aircraft, automobiles, and in a variety of other ruggedized display applications. The disclosed color switch, which is an electro-optic component, overcomes issues associated with slaving the display panel to an electromechanical color management system. The on-the-fly field duty-ratio control of the color switch allows changes in color temperature virtually without any loss in the efficiency. Such capability allows a display device to function efficiently as a television, a monitor, a gaming device, and the like.

Disclosed embodiments also provide a color switch configured for rapid modulation between fields, which enables "local-temporal-notching" when the blanking between fields is not needed for a particular display panel. The rapid switching capability (continuous viewing) of the color switch provides global update of display panels, which enhances the throughput. For example, frame buffering and a fast liquid crystal response time allows two or more images to be written to the backplane for each field. Thus, the white content of the image can remain ON during the transition between fields. In such cases, the color switch can switch in roughly within 10–50 microseconds between fields without a significant degradation in color coordinates or throughput. Such capability of the color switch eliminates temporal losses due to display "blanking" occurring even during white frames in present sequential color systems.

This application further describes a liquid-crystal-based color switch using the splitting of one or more optical paths. The split-path arrangement provides higher throughput, lower cost, simpler manufacturing, and feasibility to realize scrolling-color versions. In a two or three path system, the paths can be created either by wavelength splitting, polarization splitting, or a combination thereof, with color switches operating in reflective, transmissive, or a combination arrangement.

Also described is a retarder stack suitably configured to allow independent modulation of two bands in a double-pass of a common-path arrangement. According to an embodiment, a zero-twist modulator controls the polarization of a band oriented along 0/90 degrees, and another zero-twist modulator controls the polarization of a band oriented along ±45 degrees.

Further embodiments provide a color switch for reflective display devices. The color switch provides rapid switching with no moving parts. The color switch includes two double-pass liquid crystal cells that are fabricated using nematic pi-cells. These cells can provide switching speed in reflective display devices that is approximately more than four times greater than transmissive display devices. In some variations, two pi-cells are replaced with a single ferroelectric liquid crystal ("FLC") device. The FLC device can deliver switching times of approximately less than 10–30 microseconds, which is significantly faster than color wheels. The FLC device can deliver a half-wave of double-pass retardance with voltage-selectable orientation, as required in a two-color path system. In some variations, one orientation of the FLC molecules modulates blue light, while the other orientation modulates green light. To insure high transmission, a single half-wave retarder film can be added to achromatize the polarization switching properties of the FLC device.

Included in the described embodiments are compact color switch architectures that can be manufactured with low cost and low component count. In an embodiment, a folded design via a PBS is used. The PBS creates two arms, a first arm modulates a single color, and a second arm modulates two colors. The second arm uses double-pass to produce a two-color independent modulator similar to transmissive display devices, however, the two-arm version eliminates one modulator stack.

Further described is a simplified retarder stack that operates by directing red light to a single-color path. This eliminates the need for stacks in the red port. While red/cyan (or cyan/red) stacks are used at the PBS input/output, they are relatively easy to manufacture. For example, red/cyan filters can be configured as a 50:50 duty ratio design using a retarder stack of 15 layers, which can provide a performance that is equivalent to the performance of a retarder stack with 29 layers. In addition, these filters can be manufactured independently.

Further embodiments provide a color switch that supports scrolling color methods of addressing. The color switch can be built similarly to a three-panel projection color management system, where the path length for each color path is substantially the same. However, the cost of building the color switch according to the present invention is low relative to three-panel systems due to reduced performance demands and simplicity of aligning reflective striped pi-cells.

DETAILED DESCRIPTION

The present application describes a retarder stack color switch using one polarization analyzer. To provide full color in transmission mode, the conventional color switches use separate red, green, and blue stages, each independently operating on the polarization of one primary color. The color switch according to an embodiment of the present invention, improves efficiency over conventional color switches through the use of a single polarization analyzer. The single analyzer permits additive mode switching, which optimizes the chrominance of the additive primary outputs and the black state.

Moreover, the single analyzer color switch provides a white state, which is frequently used in sequential systems. Because these switches are engineered, spectral performance can be substantially optimized. The single analyzer color switch overcomes some of the cost and manufacturing challenges associated with conventional transmissive full color switches based on retarder-stack filters. Because the conventional transmissive full color switch uses a common path, individual analyzer stages are needed for each primary color (red, blue and green) and each primary color must pass through all three stages. The color switch according to an embodiment, uses a split-path, so that relatively weak colors can follow a relatively high-efficiency path.

The retarder stacks separated by polarization analyzers can be evaluated substantially as independent units. To a reasonable degree of approximation, polarizers have the property of resetting the polarization thus, allowing the prediction of system-level performance by evaluating the transmission spectra of individual components. In addition, the double-pass performance of a stack can be extracted either from transmission or double pass measurements. To further improve yield, elasticity that exists at the system level can be explored based on a more desirable situation involving interaction on a power basis.

Two-Color Common-Path Reflective Switch

Figure 1:
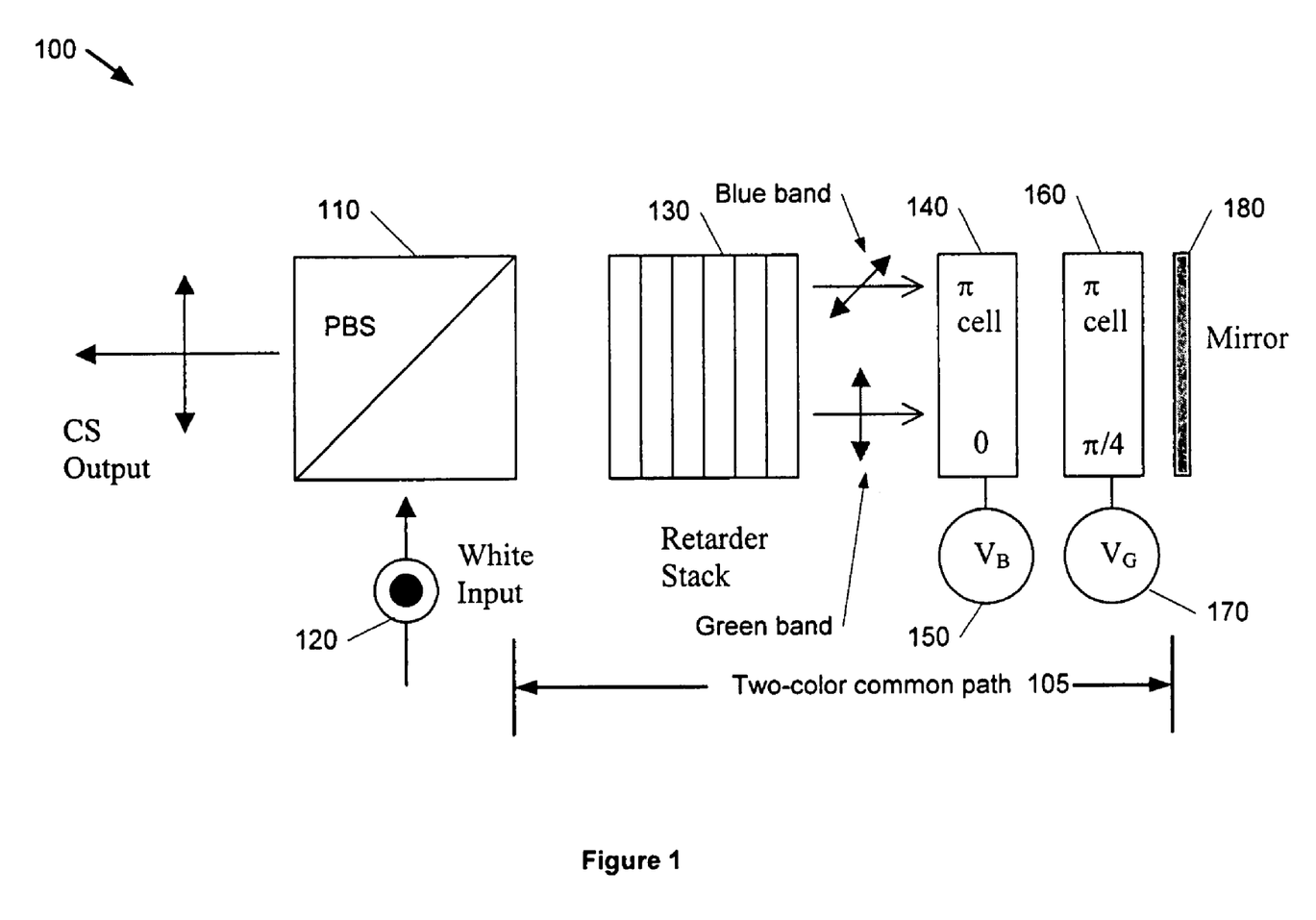
FIG. 1 illustrates an exemplary architecture of a two-color switch using a common path in reflection mode.

FIG. 1 illustrates an exemplary architecture of a two-color switch 100 using a common path in reflection mode. The switch 100 includes a PBS 110. A light source 120 provides white light input for the switch 100. In the present example, the PBS 110 directs the blue and green bands to a two-color common path 105. A retarder stack 130 is optically coupled to the PBS 110 on the two-color common path 105. The switch 100 further includes two Zero-Twist Nematic ("ZTN") pi-cells 140 and 160. The ZTN pi-cells 140 and 160 independently operate on the blue and green bands on the two color common path 105. The ZTN pi-cell 140 is 0-oriented and operates on the blue band of light. A voltage source VB 150 is coupled to the ZTN pi-cell 140. The ZTN pi-cell 160 is π/4 oriented and operates on the green band of light. A voltage source VG 170 is coupled to the ZTN pi-cell 160. A mirror 180 reflects the blue and green bands. One skilled in the art will appreciate that any combination of bands can be directed to the two-color common path 105.

The retarder stack 130 is suitably configured to provide the required polarization states to the ZTN pi-cells 140 and 160. In the present example, when the ZTN pi-cells are both driven high by their corresponding voltage sources, the blue and green bands are modulated in the two-color common path 105 and both the bands are returned to the original state of polarization after the double pass along the common path. The retarder stack 130 manipulates the polarization of the bands using pure rotation even in the transition (cyan) band. Alternatively, the circular polarization component exiting the stack due to retardation in the forward pass will be returned to the PBS 110 as orthogonal linear polarization. This light is directed to a display panel (not shown) by the PBS 110 and is therefore manifested as color-switch dark state leakage. More desirably, light that is 45-linear in the forward pass will be returned to the original state of polarization in double pass and will be shunted to the light source 120, thus minimizing color switch dark state leakage. It is the neutral modulation of ellipticity by the ZTN pi-cells that permits light to enter the display panel path.

According to another embodiment, to create independent modulation between the fields, the ZTN pi-cell oriented along 0/90 can be made to modulate 45-degree oriented light, while the ZTN pi-cell oriented along 45-degrees can be made to modulate 0/90 oriented light. In a single-pass of the stack, a first band (e.g., green) is left in the original state of polarization. This is accomplished if linearly polarized light is introduced and the stack behaves as a compound retarder with optic axis parallel/perpendicular to the input direction. When the optic axis is sufficiently stable, the retardation of the compound retarder is inconsequential because insignificant change in state of polarization occurs throughout the green band. In a second band (e.g., blue), the stack induces a 45-degree reorientation of the state of polarization.

Typically, a flat profile is required that spans a particular range of wavelengths for example, 430–480 nm for blue. At the half-wave wavelength, the state of polarization is linear, but small departures in wavelength can yield significant changes in the state of polarization due to compound retardation and/or optic axis variation of the stack. The standard impulse design software, known in the art, can determine the Fourier series for one element of the Jones matrix; either $C(\omega)$ or $D(\omega)$. Multiple designs result from the fact that, for a particular $C(\omega)$, there are multiple solutions for $D(\omega)$. However, in the present exemplary application, it is advantageous to specify the full Jones matrix.

The following is a mathematical analysis in which reflection-mode constraints are imposed on a retarder stack. First, consider a band with state of polarization manipulated by the retarder stack, which typically contains the half-wave wavelength. The general Jones matrix for the single-pass transmission of a stack can be written in the form, $$W^+ = \begin{pmatrix} a & b \\ -b^* & a^* \end{pmatrix} \qquad \text{Equation 1}$$

In the present example, the objective is to allow a pi-cell, with rubbing direction along the input polarizer, to modulate the half-wave band of the stack between orthogonal linear states in a round-trip. This requires that the forward pass of the stack produce 50% power conversion, which means that the state of polarization at the mirror is constrained to be selected from the family of elliptical polarizations with azimuth at 45-degrees. Inserting this constraint gives the matrix, $$W^+ = \frac{1}{\sqrt{2}} \begin{pmatrix} e^{i\alpha} & e^{i\beta} \\ -e^{-i\beta} & e^{-i\alpha} \end{pmatrix} \qquad \text{Equation 2}$$

The reverse pass of the stack, subject to the same constraint, can be written in a similar form.

$$W^- = \frac{1}{\sqrt{2}} \begin{pmatrix} e^{i\alpha} & -e^{-i\beta} \\ e^{i\beta} & e^{-i\alpha} \end{pmatrix} \qquad \text{Equation 3}$$

Using the above, the matrix for the double pass is represented by, $$W' = W^-W^+ = \begin{pmatrix} \cos(\alpha+\beta)e^{i(\alpha-\beta)} & i\sin(\alpha+\beta) \\ i\sin(\alpha+\beta) & \cos(\alpha+\beta)e^{-i(\alpha-\beta)} \end{pmatrix} \quad \text{Equation 4}$$

For this specific example, the generation of a black state with both pi-cells driven high (i.e., zero modulator retardation) is required which means that the off-diagonal terms of the double-pass matrix must vanish, yielding the matrix for a linear retarder with axis along the polarizer. This occurs for the relationship, $(\alpha+\beta)=\pi m$, where m is an integer. Inserting this condition into above derivation is equivalent to requiring that the stack behave as a linear retarder with arbitrary phase retardation with a wavelength stable eigenpolarization along the input polarization. The round-trip constraint can be inserted into Equation 2, to give the matrix for the forward pass of the stack. Taking $\alpha=-\phi$, $\beta=\phi$, and m=0, the matrix becomes $$W^+ = \frac{1}{\sqrt{2}} \begin{pmatrix} e^{-i\phi} & e^{i\phi} \\ -e^{-i\phi} & e^{i\phi} \end{pmatrix} \quad \text{Equation 5}$$

This matrix can be expanded as the product of two matrices, $$W^+ = \frac{1}{\sqrt{2}} \begin{pmatrix} 1 & 1 \\ -1 & 1 \end{pmatrix} \begin{pmatrix} e^{-i\phi} & 0 \\ 0 & e^{i\phi} \end{pmatrix} \quad \text{Equation 6}$$

Equation 6 represents a retarder with arbitrary retardation and wavelength stable optic axis along the polarizer, followed by a pure rotator with wavelength stable 45-degree rotation. Because the retarder is external to the rotator with optic axis along the input polarizer, it has no effect on the double-pass transmission. As such, it can be dropped from the analysis. The net result is that the above constraints force the stack to behave as a pure rotator in a half-wave wavelength band.

Conventional design methods do not allow sufficient constraints to satisfy the above pure rotation case. For example, when an exit polarizer is oriented at $-\pi/4$ for a rotated band containing the half-wave wavelength, a stack can be forced to have near zero-transmission in the half-wave wavelength band and 50% transmission in full-wave wavelength band. This forces the desired linear output state, but it does not preclude compound retardation along the exit polarizer. If a compound retardation is introduced after the rotator with $\pi/4$ orientation, there is no effect on the half-wave wavelength band. However, the full-wave wavelength band, which undergoes no rotation, will have a state of polarization modulated by the double-pass of the compound retarder. Such stacks do not satisfy the above pure rotation constraint.

Similarly, when an exit polarizer is oriented at $\pi/2$ for a full-wave wavelength band (full-wave wavelength band), which is the non-rotated band, a stack can be forced to have near-zero transmission in the full-wave wavelength band and 50% transmission in the half-wave wavelength band. This forces the zero-rotation requirement in the full-wave wavelength band, but it does not preclude compound retardation along the exit polarizer. If a compound retardation is introduced after the above rotator with orientation 0, then there is no effect on the full-wave wavelength band, but the half-wave wavelength band, which undergoes a $\pi/4$ rotation, will have state of polarization modulated by the double-pass of the compound retarder. This again is an undesirable situation. Thus, using conventional design methods, any compound retardation that occurs at the exit of the rotator, regardless of the orientation, has an undesirable effect on this particular example and is not consistent with the ideal condition derived above with appropriate constraints.

According to an embodiment, a retarder stack can be configured to satisfy the above derived conditions, including arbitrary-input compound retardation oriented parallel to the input, zero rotation in the full-wave wavelength band, pure $\pi/4$ rotation in the half-wave wavelength band, and zero-output compound retardation. An example of such a stack design for blue/green modulation is shown in Table 1.

TABLE 1

Stack design for a pure rotator in the blue band. The film is 600 nm full-wave, with 443 nm 1.5-wave.

| Retarder Number | Retardation | Orientation |
|---|---|---|
| 1 | 600 nm | −15.1° |
| 2 | 600 nm | −15.2° |
| 3 | 600 nm | 57.0° |
| 4 | 600 nm | −77.8° |
| 5 | 600 nm | 66.9° |

Figure 2:
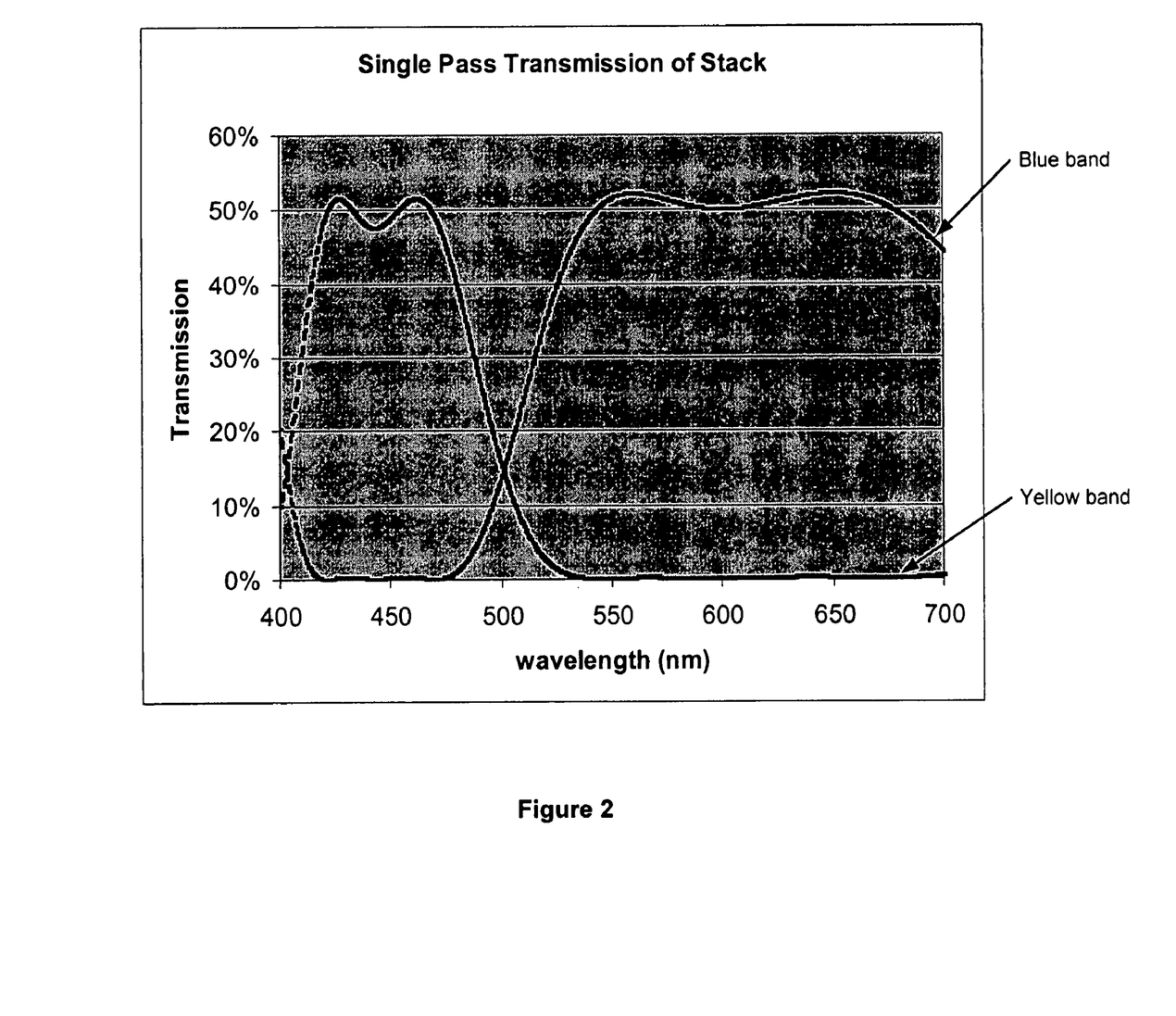
FIG. 2 illustrates a spectra associated with single-pass transmission of a blue/green stack placed between polarizers and configured for an exemplary reflection mode operation.

FIG. 2 illustrates the spectra associated with the single-pass transmission of a blue/green stack placed between polarizers and configured for an exemplary reflection mode operation. The stack was configured using the design illustrated in Table 1. The yellow spectrum (green+red) is obtained with the exit analyzer oriented at $-\pi/4$ and the blue spectrum is obtained with the exit analyzer crossed with the input polarization. To demonstrate the pure rotation with no output compound retardation, the stack can be evaluated in double-pass, which involves following the stack of Table 1 with a stack containing the same angles in reverse order.

Figure 3:
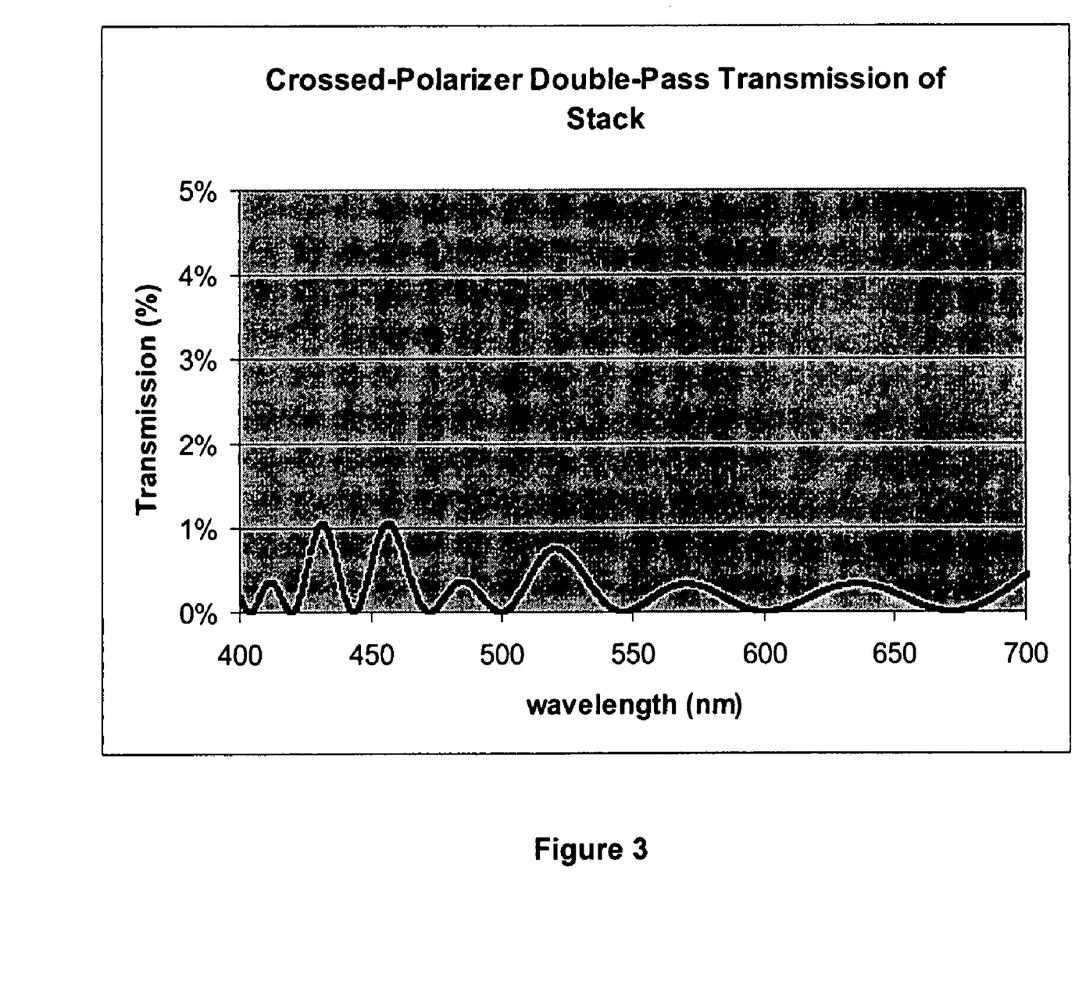
FIG. 3 illustrates the spectra associated with the double-pass transmission of a blue/green stack placed between polarizers and configured for an exemplary reflection mode operation.

FIG. 3 illustrates the spectra associated with the double-pass transmission of a blue/green stack placed between polarizers and configured for an exemplary reflection mode operation. The spectra shows quasi wavelength stable round-trip eigenpolarization for a double-pass transmission through the stack of Table 1, placed between crossed polarizers. The spectra further illustrates that leakage below 1% is transmitted in double-pass between crossed polarizers, demonstrating that a moderate contrast dark state can be observed when the modulators are driven high (or vanish). As stated above, output stack retardation can cause modulation of the state of polarization and undesirable modulation of the transmission spectrum in one round-trip. However, this same mechanism is used to modulate the state of polarization and therefore, the crossed-polarizer transmission of the two bands. A modulator at the output of the stack, with zero-twist, and a quasi-achromatic double-pass half-wave retardance, can convert an entire color band to the orthogonal polarization.

Referring to FIG. 1, when both the ZTN pi-cells 140 and 160 are driven high, the spectrum of FIG. 3 results. However, when the voltage is reduced on the 0-oriented ZTN pi-cell 140, giving a quarter-wave of retardation at 440 nm, blue light is efficiently converted to the orthogonal state of polarization and is transmitted to the display panel (not shown). Conversely, when the $\pi/4$-oriented ZTN pi-cell 160 provides a quarter-wave of retardation at 550 nm, green light is converted to the orthogonal state.

Figure 4:
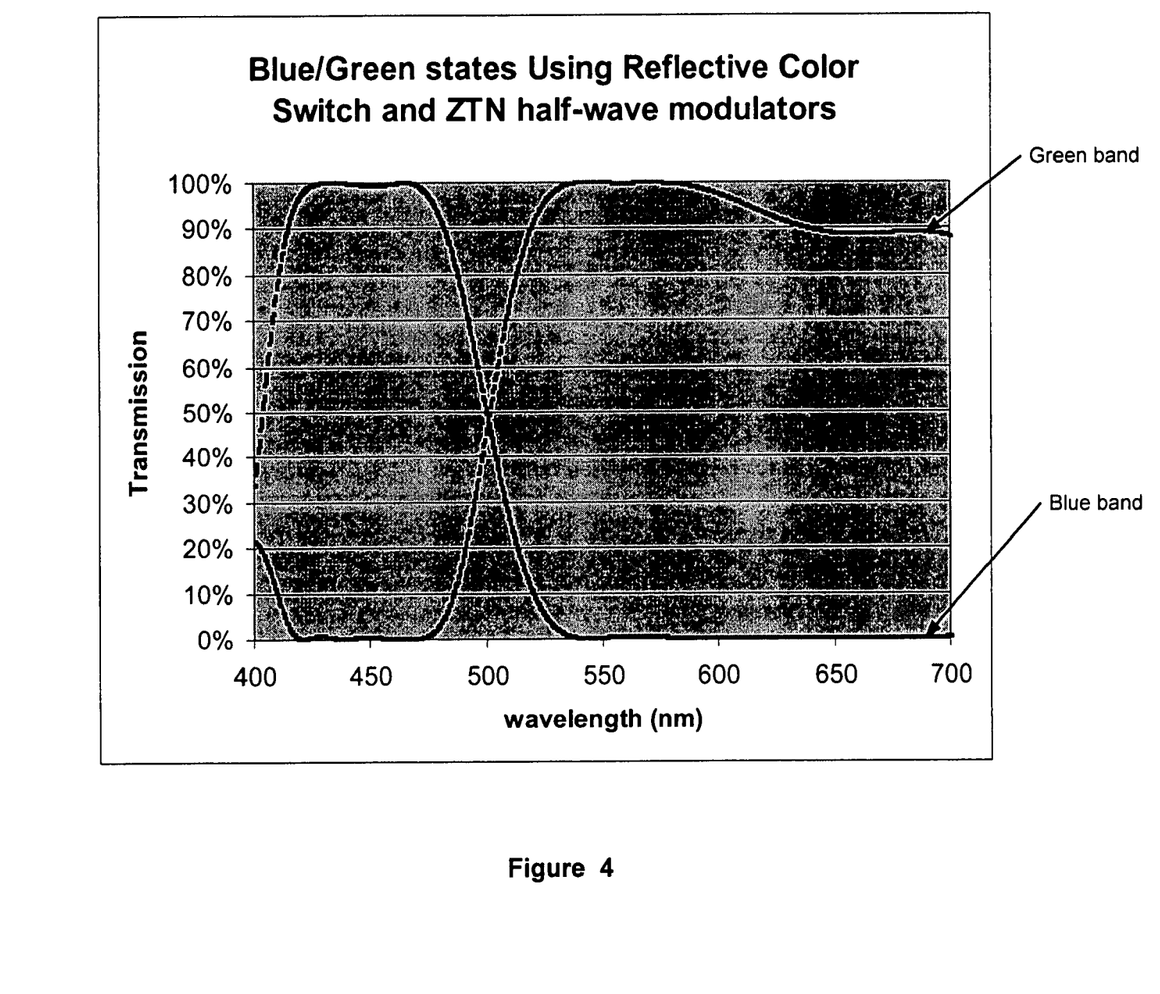
FIG. 4 illustrates the spectra produced by an exemplary architecture of a two-color switch using a retarder stack under the condition of ideal polarizing beam splitter behavior.

FIG. 4 illustrates the spectra produced by the exemplary architecture of the two-color switch 100 shown in FIG. 1 using the stack configuration described in Table 1 under the condition of ideal PBS behavior. The spectra is a blue and green spectra generated by alternatively providing half-wave retardation on two orientations.

Other design considerations, such as in-plane and z-compensation of the modulators are known in the art. Also, the placement of the color switch within the optical system affects the degree to which angular effects are imaged onto the display screen. To some degree, color switches shows both incidence angle and azimuth dependence of transmitted color. Under ideal circumstances, the color switch is telecentrically illuminated such that a cone passing through any point of the color switch illuminates the entire display screen. Optical systems can be designed to mitigate the effects of such sensitivity, so that spatial nonuniformities in color are not present at the display.

One of the advantages of reflective color switches is the switching speed relative to transmissive versions. A pi-cell operating in transmission mode and compensated for in-plane leakage often has difficulty producing a half-wave of retardation swing in the red (620 nm) without the onset of twist. The twist is more likely to occur at the elevated temperatures of projectors with a profound effect on both throughput and color quality. In transmission, 310 nm of retardation swing at 50 C is required in the red for full-off to full-on, giving a worst-case time constant. However, initial delay in rise-time can be virtually eliminated by a suitable shift in the liquid crystal voltage turn-off time. A small leakage can be tolerated during the transition with modest impact on gamut, but with significant brightness enhancement.

For the red panel, 10% leakage occurs with a modulator retardation set to Δ=63.7 nm. At the other end of the transition, the relative slow accumulation of retardance near the peak transmission, coupled with the characteristic s-shaped dependence of transmission on retardation, causes a large discrepancy between, 90% and 100% time constants. The 90% transmission retardation in the red is 182.5 nm, giving a 64 nm additional retardation required for full transmission. The former can extend the delay to hundreds of milliseconds and if the cell is not properly designed, then 100% transmission is never achieved without the twist for example, a compensated high birefringence (0.2) pi-cell with a thickness of 5.9 microns using fast switching liquid crystal fluid. In transmission, a cell with compensation has a 10%–90% transition time of approximately 600 microseconds. A cell with the same fluid, and a cell gap of 3.5 microns, has a double pass time constant of 180 microseconds. The latter cell switches green light (550 nm) in 130 microseconds, and blue light (440 nm) in 80 microseconds. The above design figures and performance measures, however, are merely for purposes of illustration. Systems having differing performance measures and design particulars may be selected according to system design goals. These specific examples shall not limit the scope of this patent, which shall be determined by its claims.

In-Plane Switch Version of the Two-Color Common-Path Reflective Switch

In the exemplary switching system shown in FIG. 1, the switching is accomplished by alternatively energizing the ZTN pi-cells at 0 and π/4. Functionally, a half-wave retardation is always present in a round-trip with a variable orientation. The ZTN pi-cells can therefore be replaced with a single in-plane half-wave switch. Ferroelectric liquid crystal devices are examples of such in-plane switches, offering fixed in-plane retardation and fast symmetric switching between the blue and green states.

Figure 5:
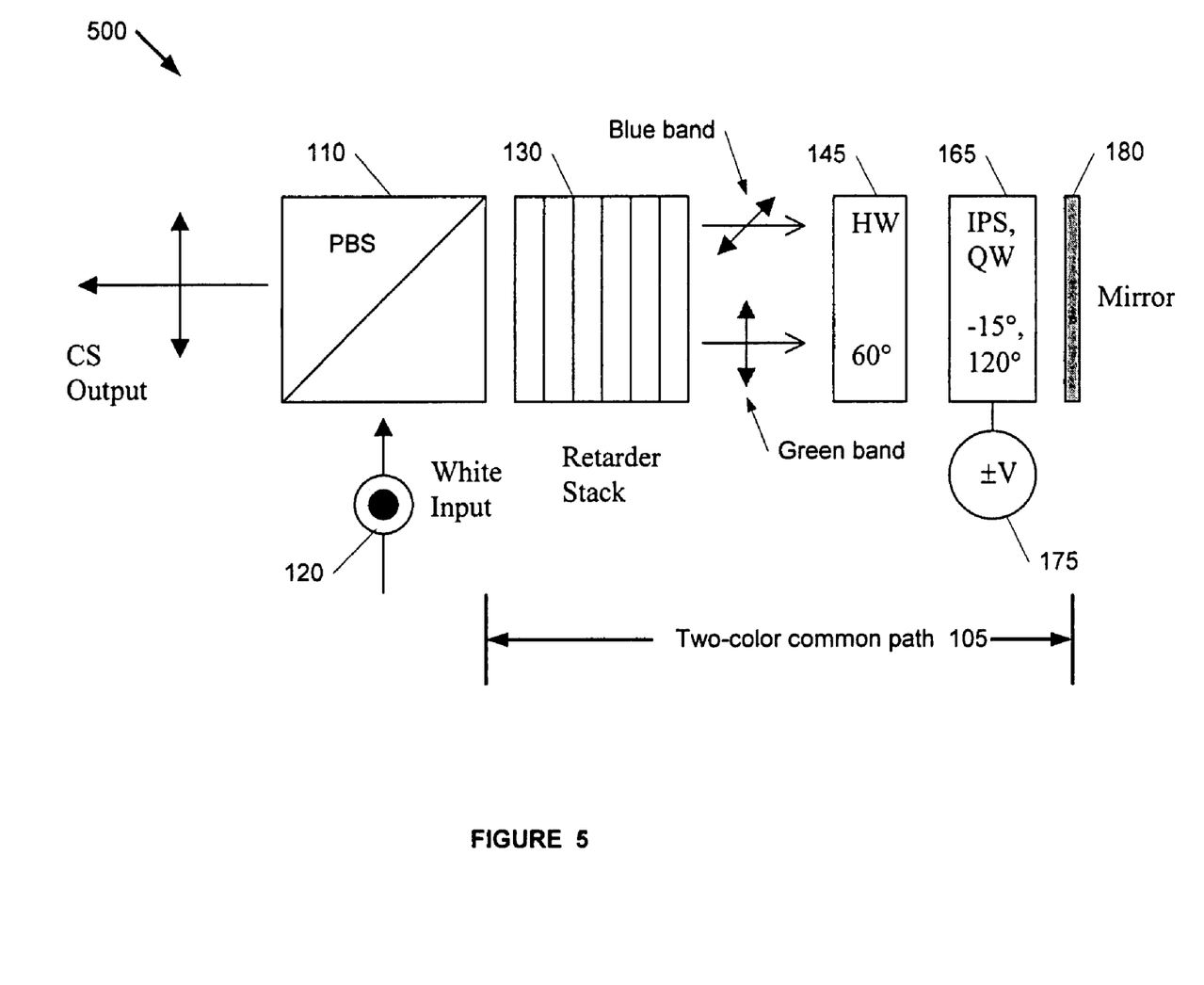
FIG. 5 illustrates an exemplary architecture of a two-color switch in a common path in reflection mode using a single in-plane half-wave switch.

FIG. 5 illustrates an exemplary architecture of a two-color switch 500 in a common path in reflection mode using a single in-plane half-wave switch. In the exemplary architecture of FIG. 1, the ZTN pi-cells were each driven to specific on-state retardation values selected to optimize the throughput of each color. However, in the exemplary architecture shown in FIG. 5, in-plane retardation is not voltage selectable. The switch 500 includes a half-wave retarder 145 oriented at 60°. An in-plane switch 165 is placed between the half-wave retarder 145 and the mirror 180. The in-plane switch 165 is driven by a voltage source 175. To provide high throughput of a particular primary color while efficiently rejecting the complement, the switch 500 ideally satisfies the constraints derived previously herein, including stable optic-axis orientation and retardation in each voltage state.

To expand the bandwidth with half-wave retardation and stable optic axis, a reflection mode achromatic compound retarder can be formed by the addition of a single half-wave retarder film. In a round-trip, the structure behaves as a three-layer compound half-wave retarder. When the in-plane switch 165 is oriented at 120°, the structure forms an achromatic half-wave retarder with 90° orientation, thus switching the polarization of blue light. The switching of green light is minimal due to the wavelength stability of the optic axis. When the in-plane switch 165 undergoes an orientation change of 45°, giving an angle of −15°, the structure forms a quasi-achromatic half-wave retarder, with a compound optic axis orientation of 45°. This switches the polarization of the green light while the blue leakage remains low due to optic axis stability. Provided that the films each give 260 nm of retardation, where 260 nm is the half wavelength of 520 nm light, the spectra for the switching system 500 are similar to those shown in FIG. 4.

Full-Color Switch Using Two-Panel Kernel

Figure 6:
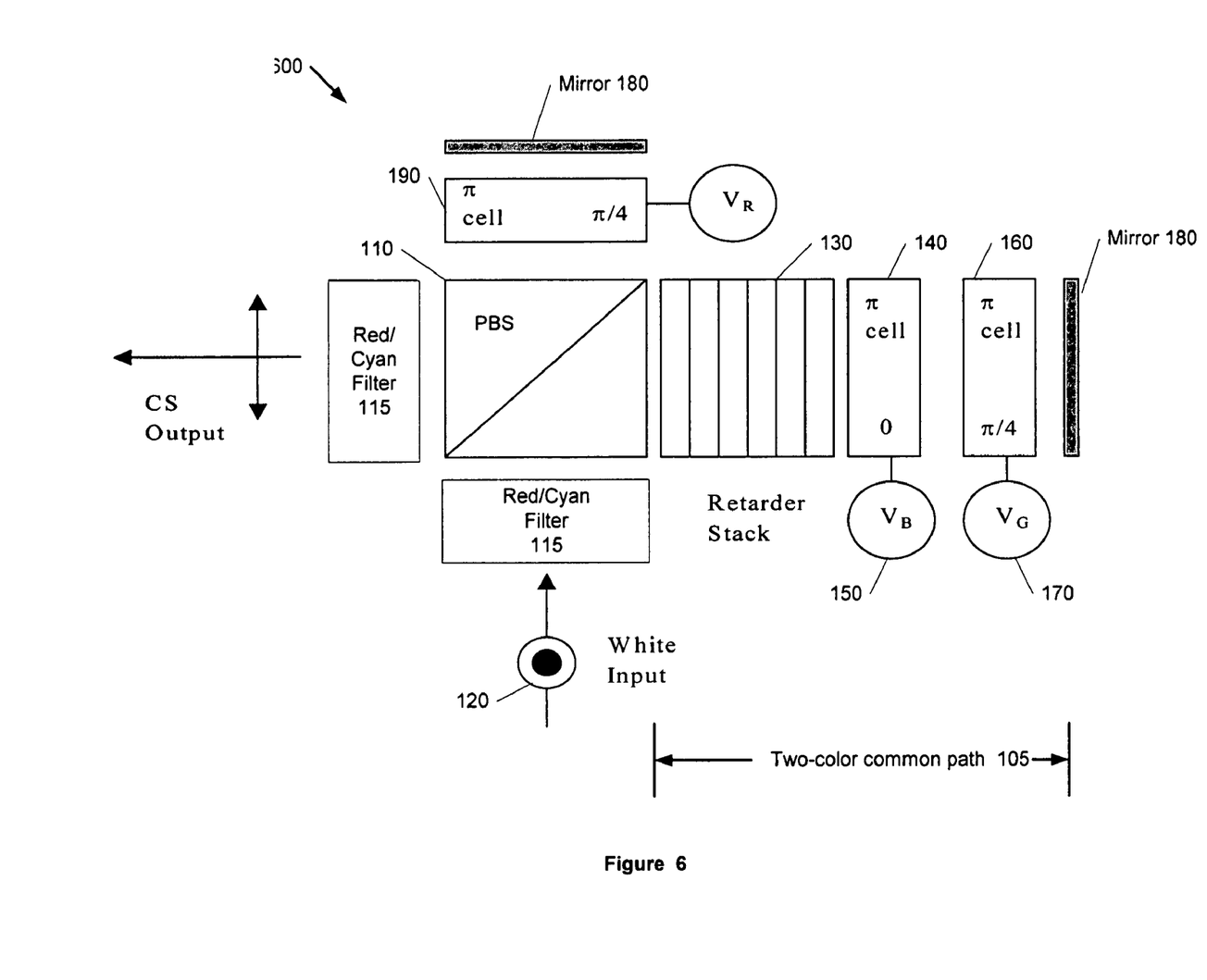
FIG. 6 illustrates an exemplary architecture of a full-color switch using a two-panel kernel.

FIG. 6 illustrates an exemplary architecture of a full-color switch 600 using a two-panel kernel in combination with the exemplary architecture of the two-color switch 100 shown in FIG. 1. In the exemplary switch 600, the second port of the PBS 110 is used to create full color modulation similar that to provided by retarder-stack-based color management systems. Two red/cyan (R/C) filters 115 are used to direct red light to one port of the PBS 110. The input R/C filter 115 is used to convert the state of polarization of primary red band to p-polarization. In the present example, the high efficiency path is given to red band, due to the relatively low red output of the input light source 120. The function of the elements in the two-color common path 105 is described previously herein. Voltages are applied to various reflective liquid crystal devices to control the degree of conversion of each primary color to the orthogonal polarization. In the present example, P-reflection of red light from each port of the PBS 110 combines at the output. The output R/C filter 115 converts this leakage to S-polarization, which corresponds to the blocking axis of the clean-up polarizer. To a desired degree, the half-power point of the output R/C filter 115 can also control the relative restoration of yellow light to a common (P) polarization. This can control the notch density that results in the yellow portion of the spectrum. A clean-up polarizer can be added between the color management system 600 and a PBS of a display panel. Alternatively, the display panel PBS can function as a clean up polarizer where the rejected light is dumped at the unused PBS port.

In some embodiments, the exemplary color switch 500 shown in FIG. 5 can be incorporated into a single-panel projection engine architecture as shown in FIG. 6. Light from the light source 120 (e.g., a ultra-high-pressure mercury lamp) is filtered for ultraviolet/infrared, processed by a P-S conversion system, and passed through a clean-up polarizer (e.g., a PBS or a wire-grid-type polarizer) before it enters the first retarder stack 130 of the color switch 600. The function of the color switch is as described previously herein. Relay optics can be used to image the light box onto a display panel such as, a Liquid Crystal on Silicon panel. In the present configuration, a polarizing beam splitter of the display panel has a reflecting surface parallel to that of the color switch. This can be beneficial when matching the polarization pupil functions is useful in managing skew rays. As discussed previously, the polarizing beam splitter of the display panel may receive a portion of undesired transition band light from the output color select that is s-polarized and is reflected out of the system for color and contrast enhancement. One skilled in the art will appreciate that other elements such as, panel and skew ray compensators, and the like, which have been omitted from the figures for purposes of illustration, can be included in the color switching system.

Full-Color Split-Path Color Switches

Some applications may modulate colors using three physically distinct paths due to cost (relative to the common-path approach), performance, or other fundamental differences in functional requirements. For example, scrolling-color may be required to accommodate a progressive scan display, which is relatively difficult to implement using common-path color switches. A three-path full-color switch can be implemented with virtually any three-panel color management system where the display panels are replaced by single-pixel or striped liquid crystal devices. In scrolling color arrangements, the striped liquid crystal devices are imaged onto the panel so that each stripe can deliver the appropriate color (red, green, blue, black, or white) to the panel depending upon the local content displayed. Selecting the appropriate color switch architecture for a business/consumer projector has a heavy cost weighting factor.

Polysilicon projectors have been instrumental in driving down the cost of color dichroic mirrors, making them attractive elements for any color management system. More recently, as silicon microdisplay-based projectors have become commonplace, components associated with three-panel color management have become increasingly inexpensive.

Many color management systems can be considered for three-path projectors. One performance-based common consideration for selecting a color management system is that nematic liquid crystal color modulators operating in reflection are inherently faster than their transmissive counterparts. Also, high-resolution structures can be etched in metal mirrors using wet etching of Indium Tin-Oxide films thus, minimizing spatial artifacts in scrolling color configurations.

Figure 7:
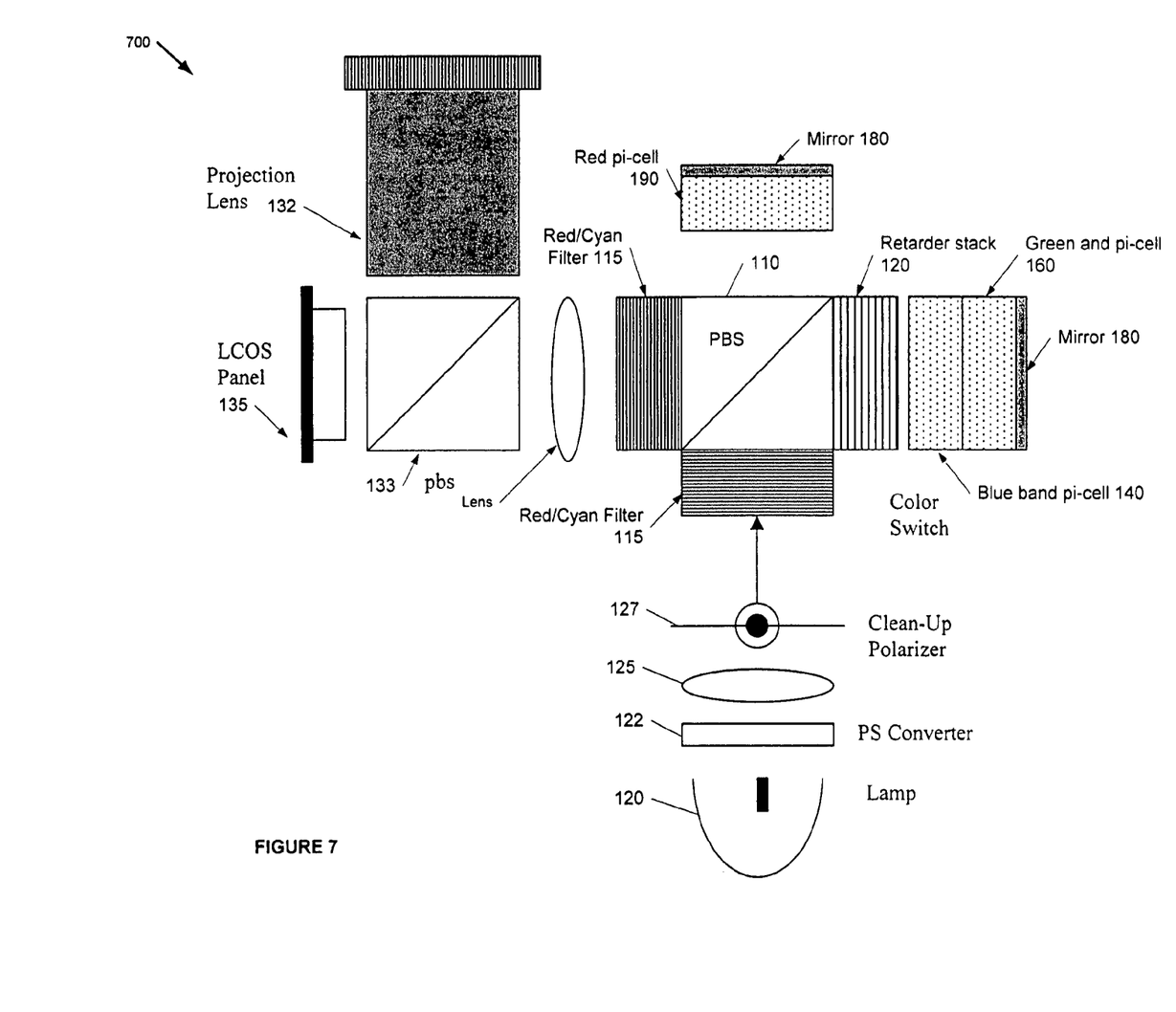
FIG. 7 illustrates an exemplary single-panel projection system using a two-path full-color reflection-mode switch.

FIG. 7 illustrates an exemplary single-panel projection system 700 using two-path full-color reflection-mode switch shown in FIG. 6. The red band has a separate path from blue/green path. The exemplary system 700 uses a series of readily available low-cost components including red-reflecting and red-transmitting dichroic mirrors, enhanced aluminum high reflector mirrors, and dye-stuff polarizers. The blue/green path includes a two-color switch, while the red path includes a compensated pi-cell half-wave switch 190.

Figure 8:
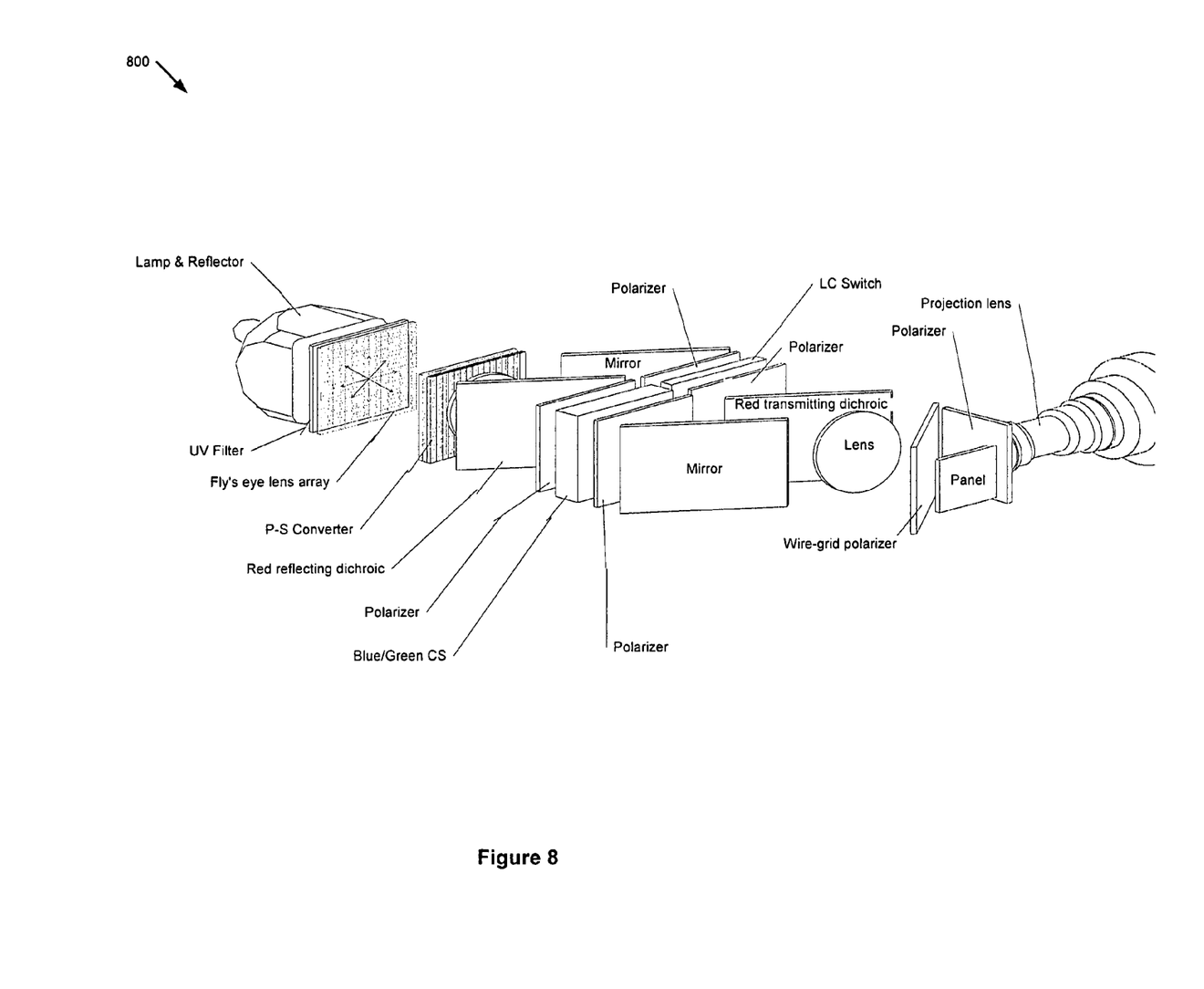
FIG. 8 illustrates an exemplary projection system using an "L" architecture.

FIG. 8 illustrates an exemplary projection system 800 using the "L" architecture. In the present example, polarized light enters a green/magenta color-select filter. These filters can be either glass endcapped, or free-standing direct anti-reflection coated retarder stacks. Either a plate- or cube-type polarizing beam-splitter separates green from magenta. In the magenta path, a dichroic mirror, ideally non-polarizing in the magenta, further separates blue from red. Each path has a reflective pi-cell modulator that controls the state of polarization of each primary color. The pi-cell can be a single pixel device, or each pi-cell can have stripes to enable scrolling color. Light from each path that is converted to the orthogonal state of polarization, exits the fourth port of the PBS. The primary bands are restored to a common polarization by the output green/magenta filters. As discussed previously, the duty-ratio of the input/output green/magenta filters can be slightly different so that cyan/yellow light is polarized orthogonal to the primaries at the output. The polarizing beam-splitter of the LCoS panel can also function as the clean-up polarizer to enhance color and contrast.

Similarly, various split-path full-color switching architectures can be configured using the exemplary embodiments described herein. For example, a dichroic mirror can create two color paths, which are directed along a common direction with a broadband high reflector. One path can be directed to a two-panel kernel (input/output color filters, and two LCD ports), while another can be directed to a second polarizing beam-slitter that includes a single color modulator. A glass spacer can be used to match the paths. Light exiting the two-panel kernel can be combined with light exiting the second polarizing beam-slitter, using the spare port of the latter. This light can then be directed to the polarizing beam-slitter of the LCOS panel.

Figure 9:
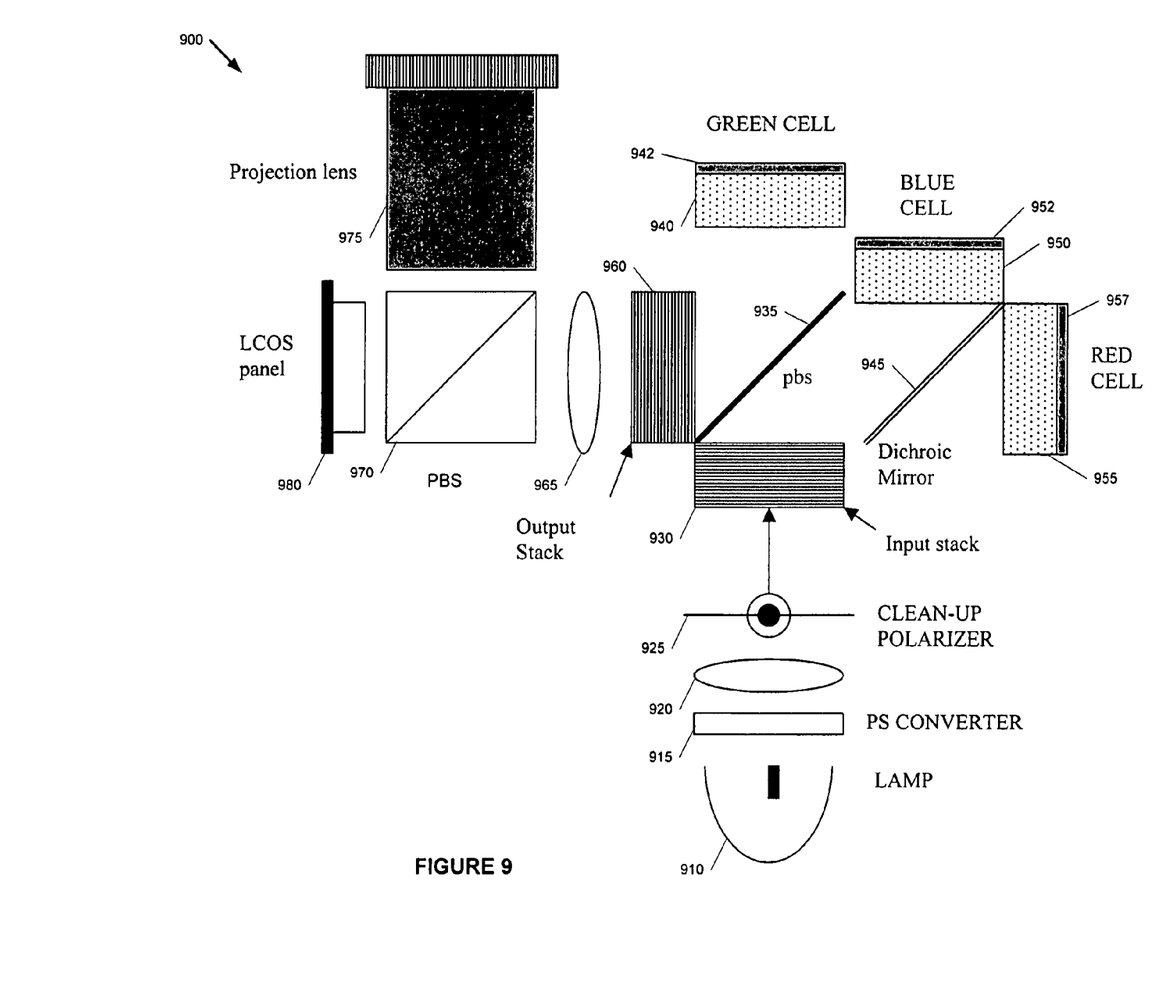
FIG. 9 illustrates an exemplary architecture of a single-panel projection display system using a three-path reflective color switch.

FIG. 9 illustrates an exemplary architecture of a single-panel projection display system using a three-path reflective color switch 900. The switch 900 includes a light source lamp 910. The lamp 910 provides an input light. A p-s converter 915 converts the polarization of the input light. An integrated lens 920 focuses the input light to a clean-up polarizer 925. The clean-up polarizer 925 is configured to transmit the input light with the desired polarization and remove the components of the input light whose state of polarization was not converted by the p-s converter 915. The input light passes through an input retarder stack 930. The input retarder 930 is configured to rotate the polarization of the input light such that a PBS 935 can direct primary bands of the input light to corresponding modulators.

In the present example, the PBS 935 is configured to transmit the green primary band and reflect the rest of the input light to a dichroic mirror 945; however, any combination of primary color bands can be selected for the reflection and transmission by the PBS 935 and the dichroic mirror 945. The green primary band of the input light is processed by a green modulator cell 940 and is reflected by a reflective mirror 942. The dichroic mirror is configured to reflect the blue primary band of the input light to a blue modulator cell 950 and transmit the red primary band to a red modulator cell 955. The green, blue, and red primary bands are processed by corresponding modulators and are directed to a display system via an output retarder stack 960. The display system can include a lens 965 and a PBS 970 to further process the primary color bands. The processed light is projected on a LCoS display panel 980 by a projection lens 975.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

The section headings in this application are provided for consistency with the parts of an application suggested under 37 CFR 1.77 or otherwise to provide organizational cues. These headings shall not limit or characterize the invention (s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A color switching system operable to receive an input light, comprising:
   a first light-directing element positioned to receive the input light and operable to direct a first portion of the input light comprising at least two primary colors along a first light path;
   a first reflecting element positioned at an end of the first light path;
   a retarder stack positioned along the first light path between the first light-directing element and the first reflecting element; and
   at least one changeable polarization rotation element positioned along the first light path between the first light-directing element and the first reflecting element, the at least one changeable polarization rotation element and the retarder stack configured to impart a first polarization to at least one primary color of the at least two primary colors when the at least one changeable polarization rotation element is in a first state.

2. A color switching system according to claim 1, further comprising:
   a second light-directing element operable to direct light having the first polarization along a first path and light having a second polarization along a second path.

3. A color switching system according to claim 2, wherein the first light-directing element and the second light-directing element are the same element.

4. A color switching system according to claim 2, wherein the first light-directing element and the second light-directing element are the different elements.

5. A color switching system according to claim 1, wherein the at least one changeable polarization rotation element and the retarder stack are further configured to:
   impart the first polarization to a first primary color of the at least two primary colors and a second polarization to a second primary color of the at least two primary colors when the at least one changeable polarization rotation element is in the first state; and
   impart the second polarization to the first primary color and the first polarization to the second primary color when the at least one changeable polarization rotation element is in a second state.

6. A color switching system according to claim 5, wherein the at least one changeable polarization rotation element is oriented at about 120 degrees in the first state and at about 45 degrees in the second state.

7. A color switching system according to claim 6, further comprising:
   a half-wave retarder positioned along the first light path between the first light-directing element and the first reflecting element; and
   a first voltage source coupled to the at least one changeable polarization rotation element, wherein the orientation of the at least one changeable polarization rotation element is voltage selectable.

8. A color switching system according to claim 1, wherein the retarder stack is configured as a pure rotator in half-wave wavelength band of the at least two primary colors of the input light.

9. A color switching system according to claim 1, wherein the at least one changeable polarization rotation element is a Ferroelectric liquid crystal device.

10. A color switching system according to claim 2, wherein the color switching system includes at least two changeable polarization rotation elements positioned along the first light path between the first light-directing element and the first reflecting element.

11. A color switching system according to claim 10, wherein the at least two changeable polarization rotation elements and the retarder stack are configured to:
   impart the first polarization to a first primary color of the at least two primary colors when a first changeable polarization rotation element of the at least two changeable polarization rotation elements is in the first state; and
   impart a second polarization to a second primary color of the at least two primary colors when a second changeable polarization rotation element of the at least two changeable polarization rotation elements is in a second state.

12. A color switching system according to claim 11, wherein the at least two changeable polarization rotation elements and the retarder stack are further configured to:
   impart the second polarization to the first primary color of the at least two primary colors when the first changeable polarization rotation element of the at least two changeable polarization rotation elements is in the second state; and
   impart the first polarization to the second primary color of the at least two primary colors when the second changeable polarization rotation element of the at least two changeable polarization rotation elements is in the first state.

13. A color switching system according to claim 12, wherein the at least two changeable polarization rotation elements are zero-twist nematic pi-cells.

14. A color switching system according to claim 13, wherein
   the first changeable polarization rotation element is a zero-oriented pi-cell; and
   the second changeable polarization rotation element is a π/4 oriented pi-cell.

15. A color switching system according to claim 12, further comprising:
   a first voltage source coupled to the first changeable polarization rotation element; and
   a second voltage source coupled to the second changeable polarization rotation element, wherein retardation values of the first and second changeable polarization rotation elements are voltage selectable.

16. A color switching system according to claim 15, wherein the first light-directing element is further operable to direct a second portion of the input light comprising a third primary color along a second light path.

17. A color switching system according to claim 16, further comprising:
   a second reflecting element positioned at an end of the second light path; and
   a third changeable polarization rotation element positioned along the second light path between the first light-directing element and the second reflecting element, the third changeable polarization rotation element is configured to impart the first polarization to the third primary color when the third changeable polarization rotation element is in the first state and the second polarization when the third changeable polarization rotation element is in the second state.

18. A color switching system according to claim 17, wherein the third changeable polarization rotation element is a π/4 oriented pi-cell.

19. A color switching system according to claim 17, further comprising:
   a first polarization converter configured to change a state of polarization of the third primary color before the input light is directed by the first light-directing element; and
   a second polarization converter configured to change the state of polarization of the third primary color after the lights having the first and second polarizations are directed by the second light-directing element.

20. A display system comprising:
   a display panel; and
   a color switching unit coupled to the display panel, wherein the color switching unit comprises:
      a first light-directing element positioned to receive an input light and operable to direct a first portion of the input light comprising at least two primary colors along a first light path;
      a first reflecting element positioned at an end of the first light path;
      a retarder stack positioned along the first light path between the first light-directing element and the first reflecting element; and
      at least one changeable polarization rotation element positioned along the first light path between the first light-directing element and the first reflecting element, the at least one changeable polarization rotation element and the retarder stack configured to impart a first polarization to at least one primary color of the at least two primary colors when the at least one changeable polarization rotation element is in a first state.

21. A display system according to claim 20, wherein the color switching unit further comprising:
   a second light-directing element operable to direct light having the first polarization along a first path and light having a second polarization along a second path.

22. A display system according to claim 21, wherein the first light-directing element and the second light-directing element are the same element.

23. A display system according to claim 21, wherein the first light-directing element and the second light-directing element are the different elements.

24. A display system according to claim 20, wherein the at least one changeable polarization rotation element and the retarder stack are further configured to:
   impart the first polarization to a first primary color of the at least two primary colors and a second polarization to a second primary color of the at least two primary colors when the at least one changeable polarization rotation element is in the first state; and
   impart the second polarization to the first primary color and the first polarization to the second primary color when the at least one changeable polarization rotation element is in a second state.

25. A display system according to claim 20, wherein the retarder stack is configured as a pure rotator in half-wave wavelength band of the at least two primary colors of the input light.

26. A display system according to claim 21, wherein the display system includes at least two changeable polarization rotation elements positioned along the first light path between the first light-directing element and the first reflecting element.

27. A display system according to claim 26, wherein at least two changeable polarization rotation elements and the retarder stack are configured to:
   impart the first polarization to a first primary color of the at least two primary colors when a first changeable polarization rotation element of the at least two changeable polarization rotation elements is in the first state; and
   impart a second polarization to a second primary color of the at least two primary colors when a second changeable polarization rotation element of the at least two changeable polarization rotation elements is in a second state.

28. A display according to claim 27, wherein the at least two changeable polarization rotation elements and the retarder stack are further configured to:
   impart the second polarization to the first primary color of the at least two primary colors when the first changeable polarization rotation element of the at least two changeable polarization rotation elements is in the second state; and
   impart the first polarization to the second primary color of the at least two primary colors when the second changeable polarization rotation element of the at least two changeable polarization rotation elements is in the first state.

29. A display system according to claim 28, wherein the first light-directing element is further operable to direct a second portion of the input light comprising a third primary color along a second light path.

30. A display system according to claim 29, wherein the color switching unit further comprising:
   a second reflecting element positioned at an end of the second light path; and a third changeable polarization rotation element positioned along the second light path between the first light-directing element and the second reflecting element, the third changeable polarization rotation element is configured to impart the first polarization to the third primary color when the third changeable polarization rotation element is in the first state and the second polarization when the third changeable polarization rotation element is in the second state.

31. A display system according to claim 30, wherein the color switching unit further comprising:

a first polarization converter configured to convert a state of polarization of the third primary color from a first state to a second state before the first portion of the input light is directed by the first light-directing element; and a second polarization converter configured to change the state of polarization of the third primary color from the second state to the first state after the lights having the first and second polarizations are directed by the second light-directing element.

32. A method of switching colors comprising:

receiving an input light;

directing a first portion of the input light comprising at least two primary colors along a first light path;

imparting a first polarization to a first primary color of the at least two primary colors and a second polarization to a second primary color of the at least two primary colors in a first state of at least one changeable polarization rotation element, wherein the at least one changeable polarization rotation element is positioned along the first light path;

imparting the second polarization to the first primary color and the first polarization to the second primary color in a second state of the at least one changeable polarization rotation element; and reflecting the at least two primary colors at an end of the first light path.

33. A method according to claim 32, further comprising:

directing a second portion of the input light comprising a third primary color along a second light path; and imparting the first polarization to the third primary color in the first state of a first changeable polarization rotation element positioned along the second light path and the second polarization in the second state of the first changeable polarization rotation element.

34. A method according to claim 33, further comprising:

directing light having the first polarization along a first path and light having the second polarization along a second path.

35. A method according to claim 34, further comprising:

changing a state of polarization of the third primary color from a first state to a second state before directing the first portion of the input light; and changing the state of polarization of the third primary color from the second state to the first state after directing the lights having the first and second polarizations.

* * * * *